United States Patent
Duplessis et al.

(10) Patent No.: US 6,370,356 B2
(45) Date of Patent: Apr. 9, 2002

(54) APPARATUS AND METHOD OF PROVIDING A MOBILE COMMUNICATION SYSTEM

(75) Inventors: Philippe Duplessis, Colombes; Thierry Lucidarme, Montigny-le-Bretonneux, both of (FR)

(73) Assignee: Nortel Matra Cellular, Guyancourt Cedex (FR)

( * ) Notice: Subject to any disclaimer, the term of this patent is extended or adjusted under 35 U.S.C. 154(b) by 0 days.

(21) Appl. No.: 09/174,894

(22) Filed: Oct. 19, 1998

(30) Foreign Application Priority Data

Oct. 17, 1997 (EP) .............................................. 97402454

(51) Int. Cl.[7] .................................................. H04B 1/10
(52) U.S. Cl. ........................................ 455/63; 455/426
(58) Field of Search ................................. 455/422, 447, 455/454, 462, 464, 426, 552, 553, 513, 434, 509, 63; 375/132, 346

(56) References Cited

U.S. PATENT DOCUMENTS

| | | |
|---|---|---|
| 4,790,000 A | 12/1988 | Kinoshita |
| 5,142,691 A | 8/1992 | Freeburg |
| 5,212,831 A | 5/1993 | Chuang |
| 5,241,691 A * | 8/1993 | Owen ........................... 455/63 |
| 5,276,908 A | 1/1994 | Koohgoli |
| 5,402,523 A | 3/1995 | Berg |
| 5,412,658 A | 5/1995 | Arnold |
| 5,448,750 A | 9/1995 | Ericksson |
| 5,459,727 A | 10/1995 | Vannucci |
| 5,561,864 A | 10/1996 | Hagio |
| 5,581,597 A | 12/1996 | Dent |
| 5,594,782 A | 1/1997 | Zicker |
| 5,625,672 A | 4/1997 | Yamada |
| 5,953,323 A * | 9/1999 | Haartsen ...................... 455/426 |

FOREIGN PATENT DOCUMENTS

| | | |
|---|---|---|
| EP | 0 594 434 | 4/1994 |
| GB | 2 296 163 | 6/1996 |
| WO | WO 94/27385 | 11/1994 |
| WO | WO 96/04760 | 2/1996 |

OTHER PUBLICATIONS

Tuttlebee, "Cordless telephones and cellular radio: synergies of DECT and GSM", Electronics & Communication Engineering Journal, 10/96, pp. 213–223.

* cited by examiner

*Primary Examiner*—Marsha D. Banks-Harold
(74) *Attorney, Agent, or Firm*—Lee, Mann, Smith, McWilliams, Sweeney & Ohlson

(57) ABSTRACT

The present invention provides a mobile radio telephone system (10, 15) and a method of operating it in which the beacon frequency is at least temporarily transmitted in a discontinuous manner. This allows a base transceiver station (2, 4, 6, 16, 20, 22) to make use of the gained time for either transmitting on another frequency or monitoring neighboring radio frequency sources for potential interference.

In a particular embodiment of the present invention, the beacon frequency is interrupted by connecting the transmission path to the receiver path within the base transceiver station (2, 4, 6, 16, 20, 22). This may be done by single pole double throw high frequency switches. The interruption may be temporary or may applied permanently.

Further, in a system in which all transmissions by the base transceiver stations (2, 4, 6, 16, 20, 22) are synchronized, mobile stations (12) are described which are adapted to measure signal strength depending upon the duty cycle of the beacon frequency.

31 Claims, 7 Drawing Sheets

APPARATUS AND METHOD OF PROVIDING A MOBILE COMMUNICATION SYSTEM

The present invention relates to an apparatus and method for providing a mobile radio communication system, particularly one of small capacity and particularly one which can operate close to a source of interference. The source of interference may be, for instance, a cellular telephone system or a point-to-point microwave source. The present invention also relates to a base transceiver station and a mobile station and methods of operating the same. The present invention may be applied to a microzone mobile telephone system including at least one base station and method of operating the same. The present invention is particularly suited for the operation of a microcellular system within a building.

TECHNICAL BACKGROUND

U.S. Pat. No. 4,790,000 describes a private mobile telephoned system associated with a building which re-uses frequencies allocated to a larger public cellular telephone system in which it lies. The private system uses frequencies which are allocated to the immediately adjacent cell of the public system.

U.S. Pat. No. 5,142,691 describes a wireless packet communication system, e.g. in within a building, which shares frequencies with other radio systems. The proposed wireless system includes means for locking the transmitter in the system when a scan indicates that at least one of the frequencies for use in the wireless system would interfere with the other radio system.

U.S. Pat. No. 5,276,908 describes a base station and a mobile station of a radio communication system both of which scan frequencies to identify frequencies used by fixed radio transmission services on a call-by-call basis. The channel for communication in the radio communication network is selected based on this scan.

U.S. Pat. No. 5,142,658 describes a detection method for a wireless communication system for detecting beacons from point-to-point microwave system. The signal strength from observed beacons is measured at both the base station and the mobile station and the frequency for communication within the wireless system is based on the measurements.

U.S. Pat. No. 5,459,727 describes a microzone mobile telephone system of low transmission power. The proposal is intended for use as an adjunct to a wired telecommunications system such as a PBX. No provisions are made to prevent disturbance from a larger overlapping cellular system. If any such disturbance should occur it is assumed that sophisticated error correction schemes compensate for the interference.

U.S. Pat. No. 5,402,523 describes a microzone mobile telephone system within a larger cellular network. A detector in the microzone system detects radio signals within one frequency band used in the overlapping larger network. The detector also estimates the disturbance risk caused by the larger network in the microzone network and the disturbance risk caused by microzone transmissions in the larger network. The detector attempts to allocate frequencies or to change to frequencies in the microzone network which cause the least disturbance.

U.S. Pat. No. 5,581,597 describes a radio personal communications system operating in a wide area cellular system. A base station within the personal communications system is allocated a frequency for communication by the wide area cellular system.

U.S. Pat. No. 5,448,750 describes a spectrum sharing system for monitoring available spectrum shared between a mobile radio communications network and incumbent radio stations. The system includes directional monitoring antennae which are located around a microcell for monitoring interfering signals from the incumbent radio stations.

U.S. Pat. No. 5,625,672 also describes a microzone mobile telephone system within a larger cellular network. The microzone system uses the same frequency band and channels as the larger network. A monitoring receiver in the microzone system detects radio signals within the frequency band used by the overlapping larger network and makes those channels which are less likely to interfere with the cellular network available to the microzone system.

Both the latter two known microzone systems require at least one monitoring receiver in addition to communications transceivers within the microzone system which adds expense to the microzone system. One problem with such systems is that the frequencies used for transmission in the microcellular system jam the receivers of the same system which are trying to monitor the activity of radio sources outside the microcellular system. '750 solves this problem by using directional antennae whose direction of reception points away from the microcell in question. Such a system is complex, requiring additional specialized antennae and receiver and analyzer electronics.

In the article "The wireless office" by Gordon J. Povey in Electronics & Communication Eng. Journal, vol. 8, no. 2, April 1996, the concept is described of providing cellular phones to employees for general use within an office building rather than the employees having conventional wire-line telephones. Low power base stations are used in the office and the cellular phones are said to be compatible with the main cellular network outside the building. This suggestion has been criticized in the article by W. H. W. Tuttlebee entitled "Cordless telephones and cellular radio: synergies of DECT and GSM", Electronics & Communication Eng. Journal, vol. 8, no. 5, October 1996, as being too expensive. The alternative solution of using a cordless telephone system within the office (e.g. DECT, Digital Enhanced Cordless Telecommunications) and a cellular system outside requires either two separate mobile telephones which operate in the respective systems, or a dual handset which can switch from the indoor cordless system to an outdoor cellular system. Such a system is proposed in U.S. Pat. No. 5,594,782.

There remains a requirement to provide an inexpensive mobile telephone system which may be 100% compatible with an adjacent cellular network and which allows, for example, a "wireless office" to be retro-fitted economically within an existing larger cellular system and without causing, or being subject to, disturbance from the cellular system. The wireless office could be, for instance, a factory or a university campus. Further, there is a requirement to be able to operate a mobile telephone system within a larger cellular system on a temporary basis, e.g. within the temporary field headquarters of an emergency operation, e.g. after a major earthquake or at an industrial fair.

It is an object of the present invention to provide a mobile radio communications system which can operate close to a source of interference, e.g. a cellular system, a microwave source or a radar scanner.

It is still a further object of the present invention to provide a mobile radio communications system which is compatible with adjacent cellular systems.

It is still a further object of the present invention to provide a lower cost microzone mobile radio communications system and a method of operating the same.

SUMMARY OF THE INVENTION

The present invention includes a cellular mobile radio communication system comprising:

at least one cell; and each base station transceiver within said cell including means for at least temporarily transmitting signals discontinuously on a beacon frequency.

The present invention also includes a mobile radio communication system comprising:

a base station transceiver including means for transmitting signals within a frequency band to one or more mobile stations and means for receiving signals, said base station receiver also including:

means for at least temporarily interrupting the transmission of signals on a beacon frequency from said base station receiver; and means for monitoring signals received by said base transceiver station in said frequency band while said beacon frequency transmission is interrupted.

The present invention also includes a mobile radio telecommunication system base transceiver, comprising:

means for transmitting signals within a frequency band and means for receiving signals, and means for at least temporarily interrupting the transmission of signals on a beacon frequency from said base transceiver station, and means for monitoring signals received by said base transceiver in the frequency band while said beacon frequency transmission is interrupted.

The present invention also includes a method of operating a cellular mobile radio communication system comprising the step of:

at least temporarily transmitting a beacon frequency discontinuously within at least one cell.

The present invention also includes a method of operating a mobile radio communication system comprising the steps of:

transmitting signals from a base station transceiver within a frequency band to one or more mobile stations;

receiving signals at said base station transceiver;

at least temporarily interrupting the transmission of signals on a beacon frequency from said base station receiver; and monitoring signals received by said base transceiver in said frequency band while said beacon frequency transmission is interrupted.

The present invention also includes a method of operating a mobile radio telecommunication system base transceiver, comprising the steps of:

transmitting signals within a frequency band to one or more mobile stations; receiving signals;

at least temporarily interrupting the transmission of signals on a beacon frequency; and monitoring signals received by said base transceiver station in said frequency band while said beacon frequency transmission is interrupted.

The present invention also includes a mobile station for use with a mobile radio communication system in which a beacon frequency is at least temporarily transmitted discontinuously, comprising:

means for selective measurement of a characteristic of received radio signals only when said beacon frequency is transmitted.

The method or station or system in accordance with the present invention is particularly suitable for use with a TDMA system such as the GSM system.

The present invention may provide the advantage that a microzone system transmits at a low power so that it does not disturb surrounding radio frequency users. Further, in accordance with the present invention, such a microzone system can monitor the beacon frequencies of surrounding radio frequency users and select frequencies which will not cause interference. Still a further advantage is that when a base transceiver station is not transmitting the beacon frequency it may transmit on other frequencies, e.g. it can perform slow frequency hopping, thus increasing the efficiency of small transceivers which do not need to have one transceiver merely to fill the slots on the beacon frequency. Further, in accordance with the present invention the time slot occupancy on the beacon frequency (duty cycle) may be adjusted optimally for the required cell capacity.

The dependent claims define individual further embodiments of the present invention.

The invention and its advantages and embodiments will be described with reference to the following drawings.

DESCRIPTION OF THE ILLUSTRATIVE EMBODIMENTS

The present invention will be described with reference to certain embodiments and to certain drawings but the invention is not limited thereto but only by the claims. Further, the present invention is applicable to generic cellular mobile telephone systems which will be exemplified in the following description by reference to the European GSM cellular mobile telephone system but the invention is not limited thereto. Detailed descriptions of the GSM system may be found in the book "Mobile Radio Communications", by Raymond Steele, Pentech Press, 1992 or "The GSM system for mobile communications", by Michel Mouly and Marie-Bernadette Pautet, Cell & Sys, 1992 as well as in the relevant GSM ETSI standards themselves. Further, the present invention will be described with respect to a small capacity system, e.g. a microzone cellular system, but the invention is not limited thereto but may find application generally. In particular, the present invention may find application wherever a mobile telephone system must operate close to sources of radio interference or to systems which may be affected by the radio communications system of the present invention. Further, although the present invention will be described mainly with reference to mobile telephone systems it should be understood that the present invention also includes within its scope any form radio communication system, e.g. packet radio systems, public mobile radio (PMR), special mobile radio (SMR), Local Area Networks, (LAN), Metropolitan Area Networks (MAN), Wide Area Networks (WAN), paging systems and cordless telephone systems as used in private homes. The present invention is not limited to any particular access method. The following description will be made with reference to a TDMA system, namely the GSM system but the invention is not limited thereto. The present invention may also be applied to systems with other access methods, e.g. Code Division Multiple Access, CDMA.

Figure 1:
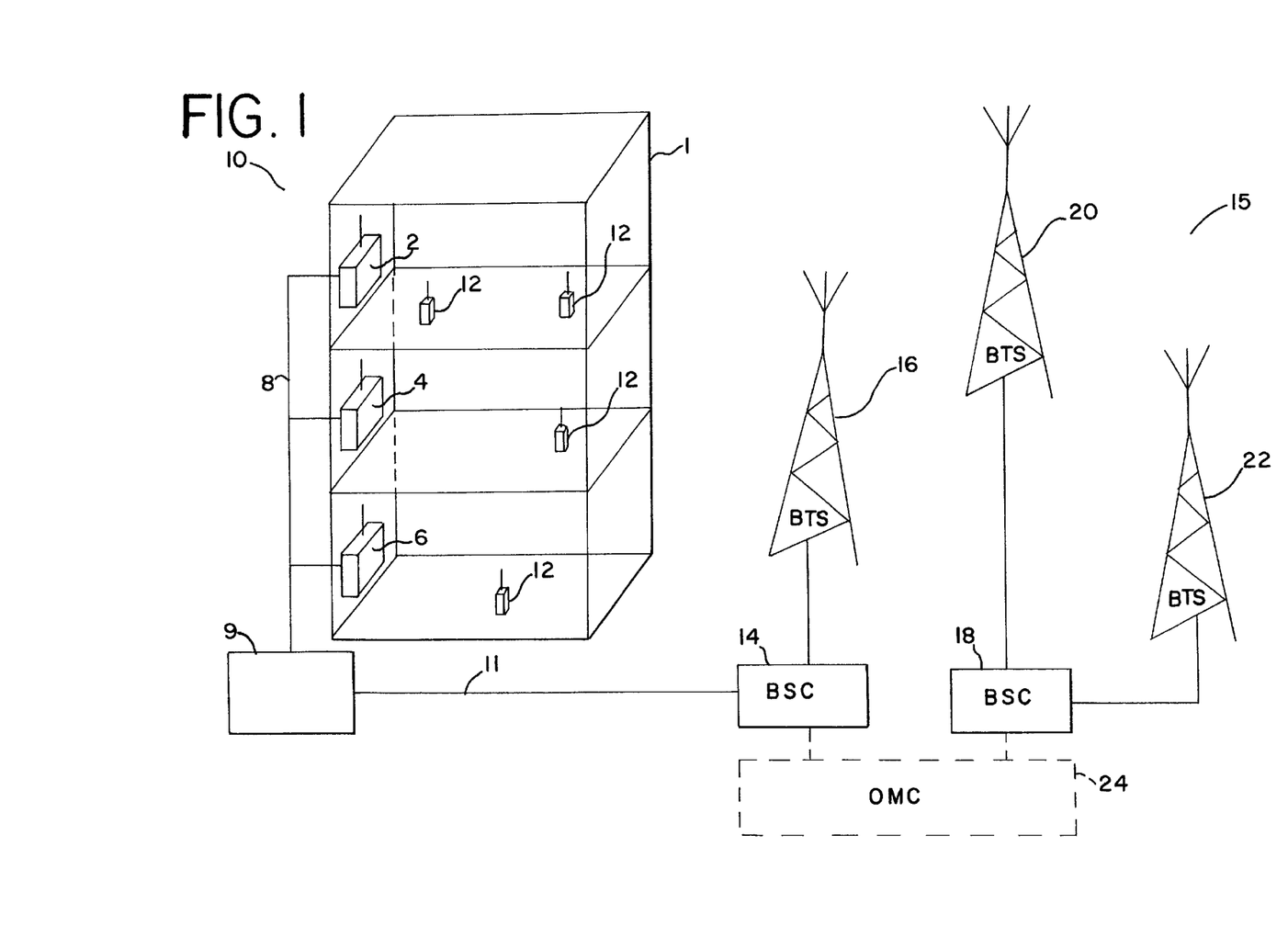
FIG. 1 is a schematic representation of a microzone mobile telephone system in accordance with the present invention.

FIG. 1 is a schematic representation of the microzone mobile telephone system 10 in accordance with the present invention. Reference numeral 1 indicates a location or a building such as an industrial fair, an airport, a hospital, a university, a military headquarters, a rock festival, emergency operations headquarters or similar, in which it is desired to install a microzone system 10 within, or close to, a potential source of interference such as a larger cellular system 15 represented schematically by the Base Transceiver Stations (BTS) 16, 20, 22 and the Base Station Controllers (BSC) 14 and 18 operatively connected to the Operations and Maintenance Center (OMC) 24, all known from the European GSM system.

The microzone system 10 includes Low Power Base Transceiver Stations (LPBTS) 2, 4, 6 located at convenient points within the location 1 and each having its own coverage area. LPBTS may be connected via lines 8 belonging to an existing redundant part of the local PBX telephone system in location 1, e.g. usually there are more than enough connection sockets in each room for telephones and one of these may be used per room for connection of the LPBTS 2, 4, 6. LPBTS 2, 4, 6 are in radio communication with mobile stations 12 within the microzone system 10. LPBTS 2, 4, 6 may have a power output of less than 5 W, preferably less than 1 W, e.g. 100 mW when microzone system 10 is within a building. The microzone system 10 is preferably compatible with the larger cellular system 15, e.g. GSM, which operates outside or around the location 1. In particular, it is preferred if the microzone system 10 in accordance with the present invention is an adjunct to the larger cellular system 15 and that mobile stations 12 may communicate with either system without being dual-mode hand-sets. Further, the microzone system 10 preferably makes use of frequencies which are available for the larger cellular system 15. Due to the sharing of frequencies between the systems 10, 15 the microzone system 10 may be a source of interference for the larger cellular system 15 and vice-versa. If the location 1 is a building there will be some electromagnetic isolation between the microzone system 10 and the cellular system 15, e.g. typically 18 dB, due to absorption of radio energy in the materials and structure of the building.

In accordance with the present invention potentially interfering transmissions are monitored. The microzone system 10 according to the present invention is remarkable for the lack of a separate monitoring antenna and separate monitoring circuits. Instead, each LPBTS 2, 4, 6 is provided with a means for at least temporarily interrupting the normal transceiver functions providing radio communications with the mobile stations 12 and for monitoring potentially interfering radio transmissions from the surrounding environment.

In a generic mobile telephone system such as GSM, many services and functions must be provided and shared by a plurality of mobile telephone users. The signaling hierarchy is complex and is illustrated for the GSM system in FIG. 2. The GSM system uses time division multiple access (TDMA) techniques and the logical signaling channels are mapped into time slots 25. The signal within one time slot 25 which is used to transfer information to and from a mobile station 12 is called a burst. Eight time slots 25 make up one TDMA frame 26. Multiframes 27 are made up of a plurality of frames 26, e.g. either 26 or 51 depending upon the function of the slots 25 in the frames 26. Superframes 28 are made up of a plurality of multiframes 27 and hyperframes 29 are made up of superframes 29.

Generally, a frequency band is allocated for transmission from the base stations 16, 20, 22 to the mobile stations (the down-link band) and a different frequency band is allocated for transmission from the mobile stations to the base stations 16, 20, 22 (the uplink band) but the present invention is not limited thereto. Each cell of a conventional cellular telephone system 15 is allocated a number of frequencies for communication purposes selected from these two bands, i.e. each slot 25 may be transmitted at one or more frequencies selected from the frequencies assigned to a particular cell. The frequencies assigned to one cell in a large system are usually not unique, there is a frequency re-use plan devised so that cells which use the same frequencies are spaced sufficiently far apart from each other that there is little or no interference. The frequency allocation and re-use plan is set up and executed by the OMC 24. This plan may be modified from time to time in order to accommodate system extensions or changes in traffic density. Such changes are carried out relatively infrequently, e.g. once a week, so that the microzone system 10 can rely on the frequency use in surrounding cells remaining constant for a considerable time, e.g. days, weeks or even months.

Generally, a BTS 16, 22, 22 transmits a burst in every time slot 25 in every single frame 26 on one of the allocated frequencies, the so-called beacon frequency C0. The bursts may be either user or system messages e.g. voice messages, data messages or control signals, or so-called dummy bursts, i.e. a special type of burst which is inserted when no other burst would be inserted. Even when frequency hopping is used within the system, no frequency hopping is used for the time slots 25 on this beacon frequency C0.

In a densely crowded and highly used conventional cellular telephone system 15 there is considerable radio signaling activity. When a mobile station is switched on, it must first identify signals coming from the various base stations 16, 20, 22 of the surrounding cellular system 15. Conventionally, the mobile stations operating with base stations 16, 20, 22 scan for the so-called beacon frequencies C0 of the base stations 16, 20, 22 in surrounding cells as these are transmitted continuously. Beacon frequencies C0 are also the frequencies at which common signaling messages are broadcast within the cells of a GSM system by the base transceiver stations. In order for the mobile station to identify that the continuous transmission at the beacon frequency C0 comes from a base station 16, 20, 22 and not from another source, particular bursts present in one or more of the slots 25 transmitted at the beacon frequency C0 may be used for recognition purposes, e.g. frequency control bursts.

The monitoring means of the present invention is adapted to monitor the frequencies of the larger cellular system 15 in at least the downlink band. In particular, the signal strengths of all the downlink frequency band are measured. In accordance with a first embodiment of the present invention, the monitoring means send the results of the monitoring of the downlink frequencies to the OMC 24 of the cellular system 15 via the local BSC 14 over transmission line 11. This may be done at regular intervals, e.g. at about 2 a.m. every night at which time it is unlikely that there is significant activity in the microzone system 10. The allocation of frequencies for use by the microzone system 10 may be made by hand in the OMC 24 taking into account the strength of the various transmission frequencies which have been monitored by the microzone system 10. The list of allocated frequencies is transmitted back to the microzone system 10 over the same transmission line 11. In accordance with a second embodiment of the present invention the allocation of frequencies for the microzone system 10 is made locally in the microzone system 10 and independent of the OMC 24. However, it is included within the second embodiment that the local final decision over allocated frequencies has been made, these are submitted to the OMC 24 and the OMC 24 may intercede and veto certain frequencies or change one or more of the frequencies allocated by the monitoring means of the microzone system 10.

In order for the monitoring to be carried out successfully, the transmission of the beacon frequencies from the LPBTS 2, 4, 6 should preferably be interrupted in order to avoid that these transmissions jam the receiver in the LPBTS 2, 4, 6. In accordance with a third embodiment of the present invention, transmission from each LPBTS 2, 4, 6 is interrupted completely during the monitoring phase. In accordance with this embodiment an LPBTS 2, 4, 6 may operate in two modes, either in a normal transceiver mode when it is in communication with the mobile stations 12 or idle, or in a monitoring mode in which transmission is stopped and the LPBTS 2, 4, 6 may only receive. For instance, the LPBTS 2, 4, 6 may be programmed to interrupt transmission at times when there is little or no activity in the microzone system 10. This may be chosen as some suitable time, e.g. 2 a.m. every night. Alternatively, interruption may be chosen by monitoring the activity within the microzone system 10. For example, if the number of access attempts to a LPBTS 2, 4, 6 drops below a certain rate, the relevant LPBTS may automatically enter the monitoring phase.

Figure 3:
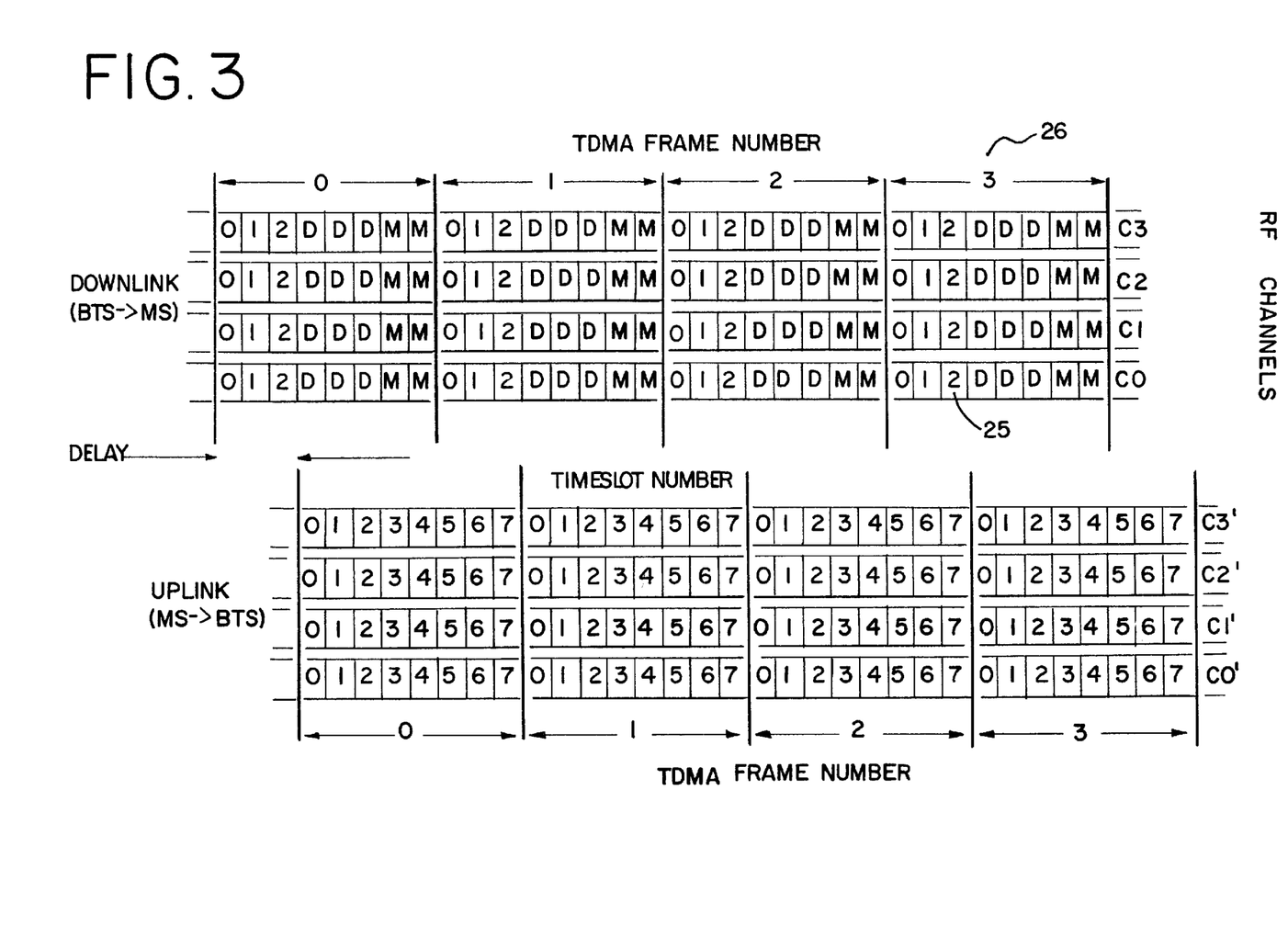
FIG. 3 is a schematic representation of the frame organization in accordance with one embodiment of the present invention.

In accordance with a fourth embodiment of the present invention the LPBTS 2, 4, 6 only interrupt the beacon frequencies of the LPBTS temporarily. Hence, the present invention includes within its scope a radio telecommunications network which has discontinuous transmission of beacon frequencies. The meaning of "discontinuous" in accordance with the present patent application does not include the ramping up and down of the transmitter in a base transmitter between contiguous bursts in two adjacent time slots in a TDM (time division multiplex) radio frequency channel. Instead, the word discontinuous means that the transmitter ramps down the signal for a period of time which normally includes the capability of transmission of useful signals, e.g. in one or more slots. The skilled person will appreciate that there are many ways of providing discontinuous transmission of the beacon frequency all of which are included within the scope of the present invention. Of these methods, a preferred embodiment of the present invention will be described with reference to FIG. 3. FIG. 3 is a schematic representation of slots 25, within traffic frames 26 transmitted in the downlink direction (LPBTS 2, 4, 6 to mobile stations (MS) 12) and in the uplink direction (MS 12 to LPBTS 2, 4, 6). Each time slot 25 in one traffic frame 26 is given a number 0–7, and each frame is given a sequential number 0, 1 . . . . At some point a maximum number is reached for frames 26 and the frame number starts again at zero. Further, frames 26 transmitted at several different frequencies C0, C1, C2, etc. are shown, i.e. frames on several different radio frequency channels. In this embodiment frequency hopping is not used in the microzone system 10. In a conventional system, all the slots 25 of traffic frames 0–3, etc of frequency C0 would contain bursts as described above, as C0 is a beacon frequency for one of the LPBTS 2, 4, 6 of the microzone system 10. However, in accordance with this embodiment of the present invention some of the slots 0–7 on frequency channel C0 are forced not to contain bursts. This is achieved by "locking" the relevant time slots. For instance, time slots 6, 7 in a certain number of frames 26, e.g. 0, 1, 2, could be locked. Alternatively these slots could be locked in all frames 26. Locking of time slots may be achieved by controlling the transceivers of LPBTS 2, 4, 6 either locally or by a signal from OMC 24. Further, slots 3, 4, 5 may be filled with dummy bursts. This leaves slots 0, 1 and 2 for transmission purposes. Assuming that slot zero only contains signaling information, this means that only two mobile users may transmit per frame, namely in slots 2 and 3. This is a severe reduction of capacity but would be acceptable if this mode of operation would be limited to low capacity periods, e.g. during the night.

As slots 3, 4, 5 from the LPBTS are filled with dummy bursts there is no response from a mobile station 12 to these dummy bursts in slots 3 and 4 of its frames, as a mobile station 12 replies to any communication from an LPBTS 2, 4, 6 with a delay of a certain number of slots, e.g. three. These uplink slots 3, 4 occur at the same time as downlink slots 6,7. Hence, the frequency channel C0 is quiet during downlink slots 6, 7. During this quiet period, the monitoring of frequencies in the downlink frequency band is carried out according to the present invention.

In some systems the above-mentioned reduction in capacity may be of no importance and the monitoring mode of operation with locking of some slots in each frame on the beacon frequency may be continuous. For instance, in a cordless telephone system for use in private houses it would be advantageous if the mobile station worked with both a the in-house cordless system and a public cellular telephone system without requiring a dual-mode mobile station. In accordance with the present invention the cordless telephone system may be a microzone radio telecommunication system 10 including LPBTS 2, 4, 6. These may be run continuously with a percentage of locked channels in each frame as described above and may monitor interfering beacon frequencies from the surrounding public cellular telephone system during the quiet periods. The reduction in the number of simultaneous users would not be serious as a household generally only has a few cordless hand-sets, rarely used simultaneously. Once the LPBTS 2, 4, 6 have determined the strong and potentially interfering beacon frequencies during the monitoring scans, the frequencies for communication within the private home may be determined based on the known frequency allocations in the surrounding cellular system. Generally, for each beacon frequency of the public cellular system, a set of hopping frequencies is allocated by the OMC 24. These sets of frequencies may be stored in the base stations of the household microcellular system. Local intelligence in these base stations (in the form of a microprocessor) may run programs which determine the all the potentially interfering frequencies from the determined strong beacon frequencies and may select suitable transmission and receive frequencies for the in-house system which avoid interference from the surrounding cellular system and at the same time do not interfere themselves with the cellular system.

Continuous operation of discontinuous beacon frequencies has a further advantage. The discontinuous transmission of the beacon frequency reduces the average energy leaving the microzone system 10 and entering the surrounding cellular system 15. Generally, within a public cellular telephone system, the decision to hand-off a call within a cell (intra-cell) or to hand-off a call to another cell (inter-cell) is based on the signal strength and/or the error rate on the channel used for the current communication. When an alternative cell is sought for a communicating mobile station or when a mobile station is first switched on, the mobile station scans the beacon frequencies from adjacent cells. The mobile measures the signal strength of each beacon frequency over a time period which may be as long as 15 seconds. Because the beacon frequencies from the microzone system 10 in accordance with the present invention do not transmit continuously, any mobile station outside the microzone system 10 will record an average power level from any LPBTS 2, 4, 6 which is reduced by the percentage of each frame which comprises locked out slots. Thus, a mobile station outside the microzone system 10 is unlikely to select a base station 2, 4, 6 from the microzone system 10 as the signal strengths will always be reduced. On the other hand, due to the short distances within the microzone system 10 between the LPBTS 2, 4, 6 and any mobile station 12, the average power level received by a mobile station 12 from each LPBTS 2, 4, 6 will still be large enough for the mobile station to recognize and log into one of them when in the microzone system. In addition, if the microzone LPBTS 2, 4, 6 are located within a building or enclosure, the attenuation caused by the materials and structure of the building or enclosure will reduce still further the power level of any beacon frequencies from LPBTS 2, 4, 6 reaching the outside of the building or enclosure. Thus, the radio telecommunication system in accordance with the present invention including discontinuous beacon frequency transmission provides a local system with produces reduced interference in any surrounding cellular system despite the fact that the radio telecommunications system according to the present invention re-uses frequencies of the larger cellular system and despite the fact that the mobile stations 12 can be standard mobile stations common to both the cellular and the local systems without being dual-mode devices.

Figure 4:
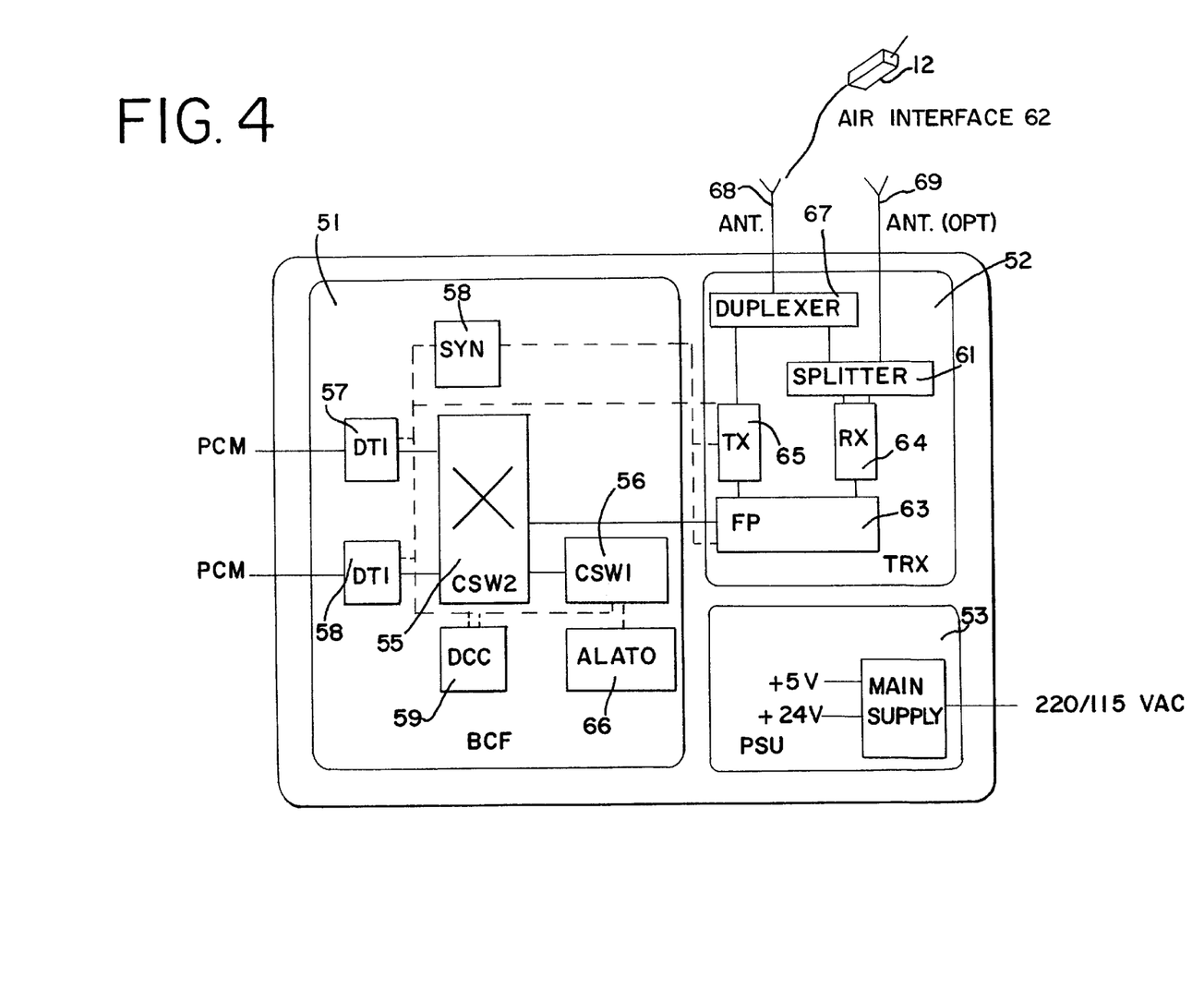
FIG. 4 is a schematic representation of a base station receiver for use with the present invention.

FIG. 4 is a schematic representation of a base transceiver station (BTS) 50 in accordance with one embodiment of the present invention. The BTS 50 preferably includes a base common function unit (BCF) 51, a transmitter receiver unit (TRX) 52 and a power supply unit (PSU) 53. The BCF unit 51 includes a control & switch double board (CSW1 and CSW2) 55, 56 to manage the LPBTS 50, to configure and supervise the other modules in the LPBTS 50 as well as to control the LPBTS operations and maintenance requirements. The BCF 51 also includes an alarm circuit 66 and a signaling concentrator 59. The BCF 51 also provides through the synchronization unit 58 the necessary timing for all the modules in the BTS 50, e.g. the reference clock for TDM radio signals on the air interface 62. The BCF 51 also provides conversion of external signals from the BSC 14, 18 to internal signals and vice versa. The PCM interface (DTI) 57 provides control of the incoming signals from, and the outgoing signals to the BSC 14, 18 (see FIG. 1) usually in the form of pulse code modulated (PCM) signaling. The BCF 51 also provides the necessary switching of the PCM slots, in particular, the multiplexing and demultiplexing of the signaling channels between the TRX 52 and the PCM slots. A further PCM interface 58 may also be used to connect BTS 50 to other BTS' in the system 10 or 15, e.g. by drop and insert. Additional TRX's may be provided within one BTS 50. BTS 50 is similar in architecture to S2000, S4000 or S8000 indoor or outdoor BTS as supplied by Nortel Matra Cellular, Guayancourt, France but modified in accordance with the present invention.

The TRX 52 provides full duplex operation on the radio interface 62, e.g. transmission of signals via the transmitter 65 and transmission coupler 67, amplification of the received radio frequency signals from the air interface 62 via the transmission coupler 67 and receiver 64 and TDMA frame processing in the frame processing unit 63. Transmission coupler 67 may be a duplexer. Further, TRX 52 may include a second antenna for spatial diversity, the main antenna 68 and the second antenna 69 being connected to the receiver RX 64 via a splitter 61.

The present invention includes a cellular system such as the microzone system 10 or the cellular system 15 in which, at least within one cell, all the BTS 50 are configured so that the beacon frequency is not continuously transmitted. For instance, each BTS 50 may perform slow frequency hopping on all frequencies including the beacon frequency even when there is only one TRX per cell. The only requirement is that at least one time slot per frame on the beacon frequency, e.g. time slot "0", is always transmitted as a common signaling channel. Preferably, the duty cycle of the frame, i.e. the number of slots for transmitting bursts of messages or dummy bursts compared to the number of slots used for monitoring, may be selected within the system to be consistent with reasonable cell capacity and reasonable waiting time for a mobile station to select a channel. Too low a duty cycle makes it difficult for mobile stations to receive sufficient signals on the beacon frequency to make a good estimate of the signal strength and therefore slows down selection of a channel by a mobile station. Preferably, not only one slot is always transmitted, e.g. slot "0" but a minimum of about 50% of each frame, more preferably 70%.

Figure 5:
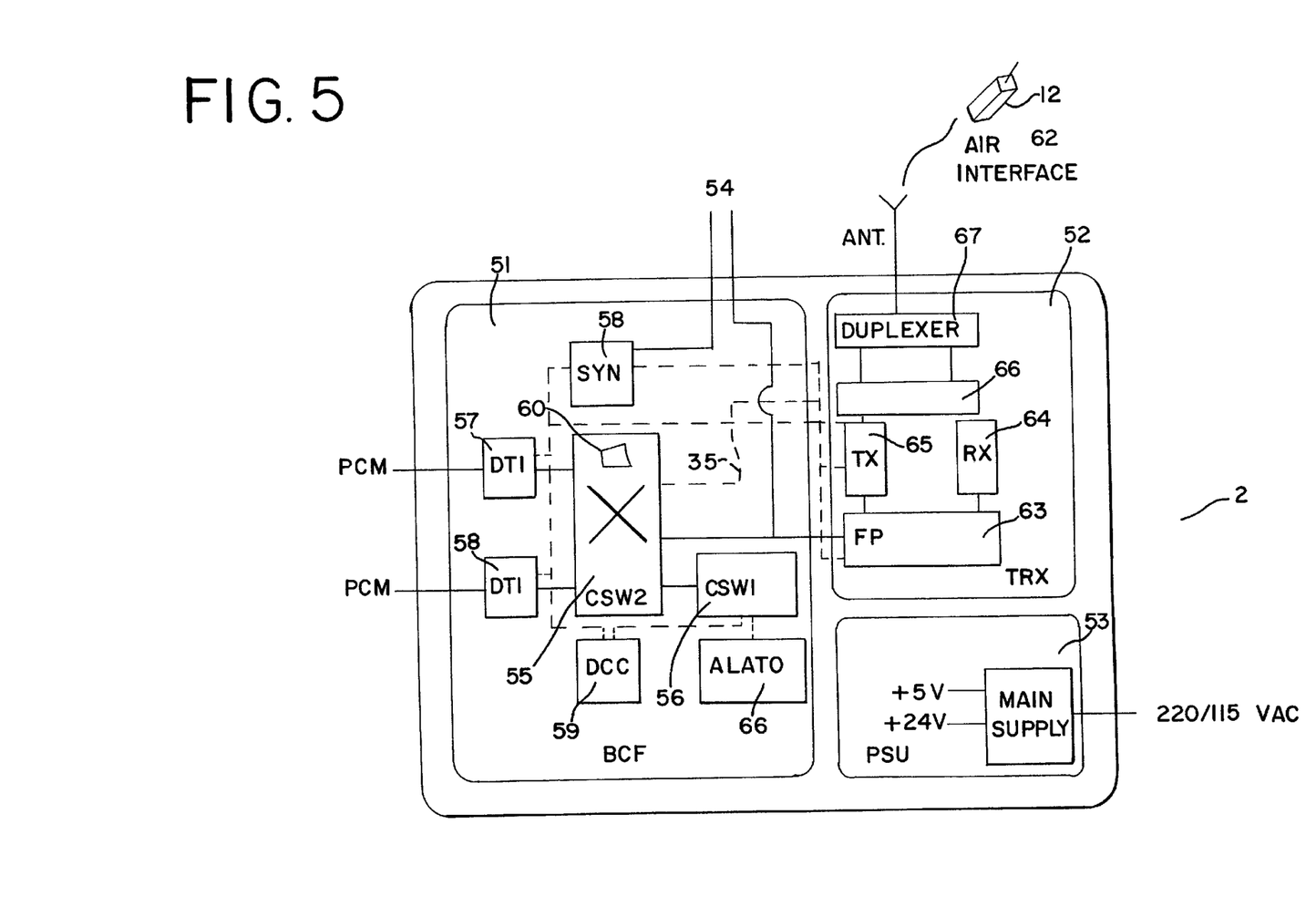
FIG. 5 is a schematic representation of a low powered base transceiver station in accordance with the present invention.

FIG. 5 is a schematic representation of an LPBTS 2 in accordance with a further embodiment of the present invention which may be any of the LPBTS 2, 4, 6 of FIG. 1. In accordance with one embodiment of the present invention all the LPBTS 2,4,6 are identical. The components with the same reference numbers in FIGS. 4 and 5 refer to items having the same functions but possibly with different power outputs. The power output of LPBTS 2 is typically 500 mW or less. TRX 52 of FIG. 5 may include a switch 66, typically two radio frequency single pole double through (SPDT) switches. Switch 66 is controlled by means of a DC signal provided on line 35. TRX 52 may also include a second antenna 69 and splitter 61 (not shown) as described with reference to FIG. 4.

Figure 6:
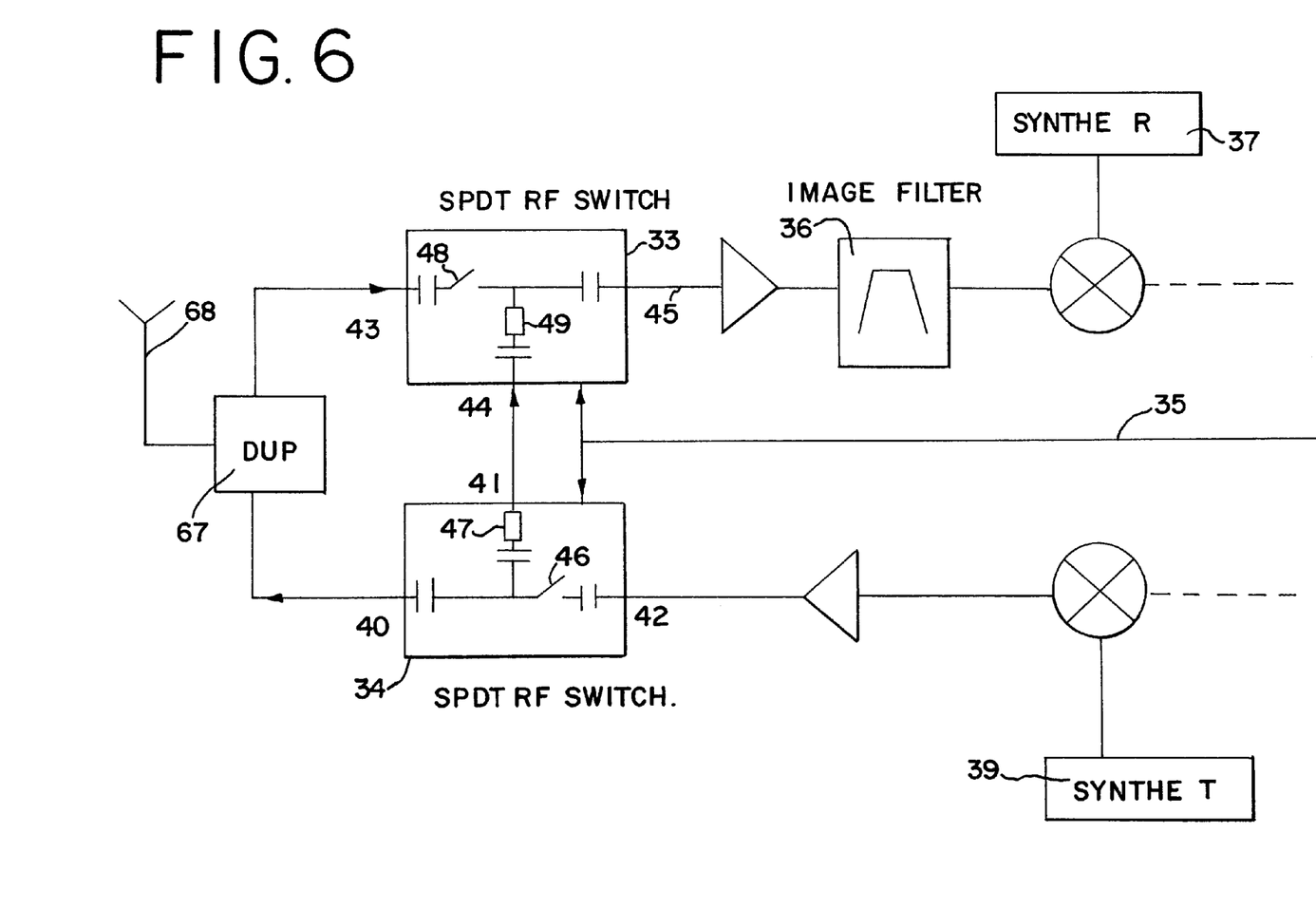
FIG. 6 is a part of a schematic circuit diagram showing part of a low power base transceiver station in accordance with the present invention.

FIG. 6 is a schematic representation of a part of the TRX 52 of LPBTS 2 shown in FIG. 5. Communications with the mobile stations 12 are carried out via the antenna 68. In the normal communication mode, the antenna 68 is connected either with a transmission circuit including a switch 34 and a transmission synthesizer 39 or a reception circuit 33, 36, 37 including a switch 33 via a transmission coupler 67 which may be a duplexer. A duplexer is a device which allows transmission and reception using a single antenna. To avoid the transmitted frequencies being received by the receiver side of transceiver 52, the duplexer preferably has a high rejection of any transmitted frequencies on its receive side and similarly a high rejection of any receiver frequencies on its transmit side. Thus, a duplexer usually includes some kind of filter to filter out any transmitted frequencies on its receive side and to filter out any receiver frequencies on its transmit side.

In the GSM system the uplink (reception mode) to the LPBTS 2 from the mobile stations 12 is in the frequency band 890 to 915 MHz and the down link to the mobile station 12 from the LPBTS 2 is 935 to 960 MHz. In other systems, e.g. DCS 1800 or PCS 1900 similar frequency bands are used, e.g. uplink for DCS, PCS respectively is 1710–1785 MHz, 1830–1910 MHz and the downlink is 1805 to 1880 Hz, 1930 to 1990 MHz respectively. Hence, in any of these systems there is a first frequency band $F_R$ for receiving a signal from mobile stations 12 and there is a second frequency band $F_T$ for transmitting to the mobile stations 12. In accordance with the present invention, the LPBTS 2 is capable of monitoring the beacon frequencies used in the external cellular system 15, i.e. it is able to receive the frequencies of transmissions from other BTS 16, 20, 22 which lie in the frequency band $F_T$. To achieve this the image filter 36 (a high-pass filter for extracting the relevant frequency band from the input signal) and the receive synthesizer 37 are adapted to receive and process both the $F_R$ and the $F_T$ frequency bands. As the bandwidth to be received is increased with respect to the normal duty of the receiver circuit (from $F_R$ to $F_R+F_T$), the width of the image band is also increased. Thus the image filter 36 should have good rejection below the lowest frequency of the lower of the two bands $F_R$ and $F_T$. In the GSM system this means that the image filter 36 should have good rejection below 890 MHz and in particular to have good rejection below about 820 MHz.

Figure 2:
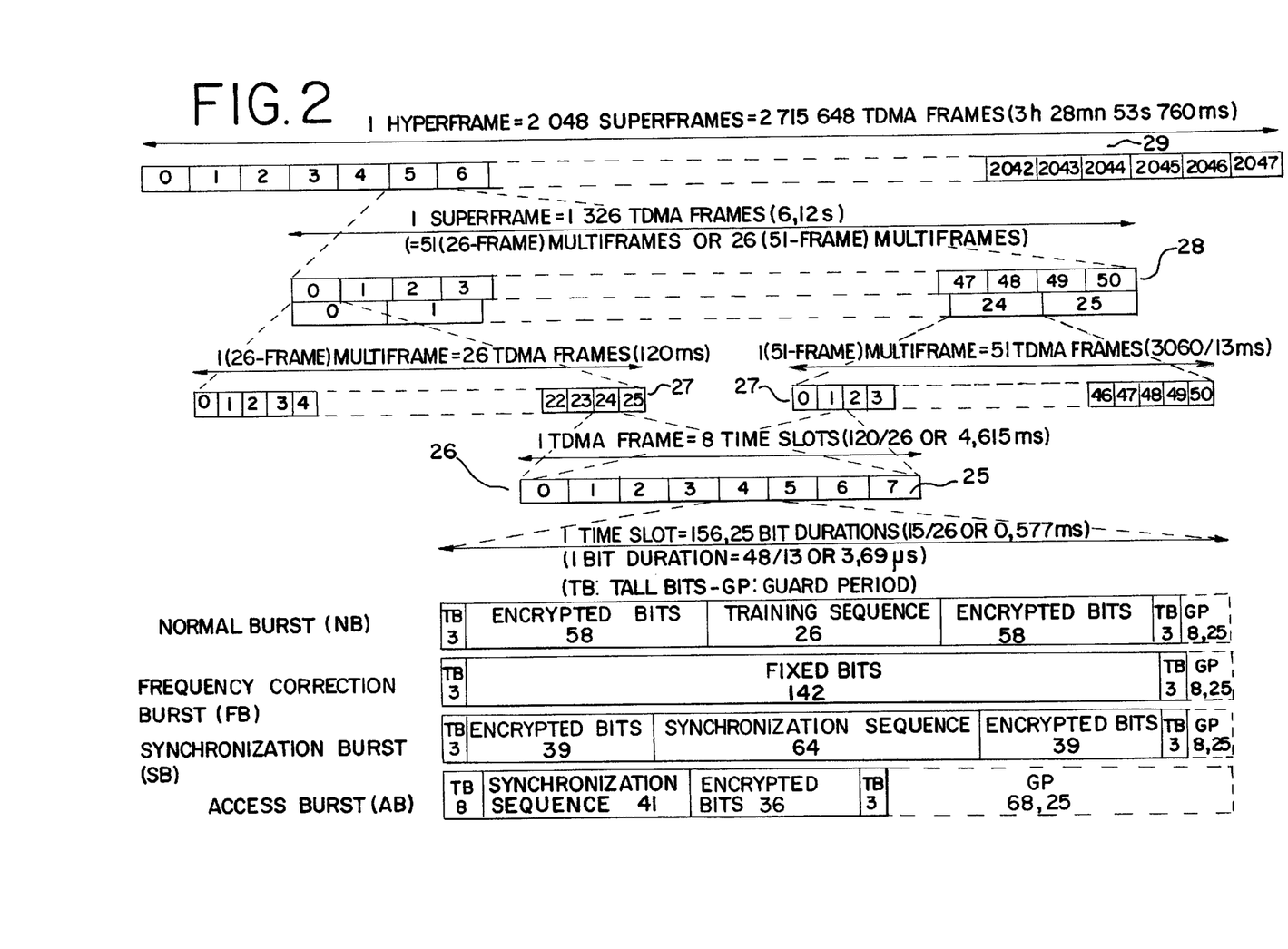
FIG. 2 is a schematic representation of a frame hierarchy in a cellular mobile telephone system.

It is preferable to interrupt at least temporarily the transmission from the LPBTS 2 of the beacon frequency during the monitoring phase. This temporary interruption does not necessarily require cessation of any other activity of the LPBTS 2. To achieve interruption of the beacon frequency, two single pole double through (SPDT) switches 34, 33 are included in the transmission and reception circuit respectively. Suitable switches can be obtained from Microwave and Video Systems Inc, Danbury. The SPDT switches 33, 34 are controlled by a DC voltage of about 10 to 20V supplied on line 35 from the BCF 51. The SPDT switch 34 in the transmission circuit has three inputs/outputs 40, 41, 42 respectively and two contacts 46 and 47 and the SPDT switch 33 in the reception circuit has three input/outputs 43, 44, 45 and two contacts 48, 49. The output 41 of switch 34 is connected to the input 44 of SPDT switch 33. In normal transceiver mode, contacts 46 and 48 of SPDT switches 34, 33 respectively are closed and contacts 47, 49 are open. To change to the monitoring mode, the appropriate DC voltage 35 is applied and contacts 46 and 48 open (as shown in FIG. 2) and contacts 47, 49 close. This stops transmission from antenna 31 as long as the contacts 46 are open and the received signals are fed to the image filter 36 and synthesizer 37. Signals received in the transmit frequency band $F_T$ are received at the duplexer 67 from the antenna 68 and are directed towards the SPDT switch 34 from where they are directed to SPDT switch 33 and so to the receiver side of the transceiver 52. When the SPDT switch 34 is transferring signals from the duplexer 67 to the receiver side of transceiver 52 it preferably has a high rejection of any signals from the transmission side which would normally be transmitted but which are prevented by the contact 46 being open. Rejection of 70 dB may be obtained with the SPDT switches available from Microwave and Video Systems Inc, Danbury mentioned above. Synthesizer 37 scans the frequency bands $F_T$ and $F_R$ and feeds these signals to the frame processor 63 which processes these into digital signals. The BCF 51 determines a measure of any suitable indication of signal strength or signal quality from the signals from the frame processor 63, e.g. the measurement Rxlev known from GSM recommendation ETS 300578, which is defined as the RMS received signal at the LPBTS 2 measured over the full range of −110 dBm to −48 dBm with an accuracy of +4 dB from −110 dBm to −70 dBm and with an accuracy of +6 dB over the full range. The results of the monitoring may be stored locally before transmission to the OMC 24, e.g. on tape or a disc drive, or transmitted directly to the OMC 24. The results may be transmitted via a modem 9 along transmission line 11. The BCF 51 may already carry out a preselection, e.g. deletion of particular frequencies which are likely to cause interference, e.g. above a certain threshold, before sending the results to OMC 24.

To carry out the above embodiment, LPBTS 2 may include processing means 60, e.g. a computer or processor board, preferably in the BCF 51 for management of the transmit frequency band measurement, periodic switching of the SPDT switches using the DC voltage signals on line 35 and of the synthesizers for receipt of the transmit frequency band, analysis of the results provided by the frame processor 63 during the monitoring and periodic transmission of the results to the OMC 24.

In accordance with one embodiment of the present invention, SPDT switches 33, 34 are controlled by the BCF 51 so that all transmission is prevented, e.g. at a time of little use of the microzone system 10, for instance daily at a time between 2 and 3 a.m. In accordance with another embodiment of the present invention, complete transmission is not interrupted but only the beacon frequency is not transmitted for a portion of each frame 26. In order to be able to monitor the transmission frequencies, some time slots on the beacon frequency in each frame are used for monitoring as described with reference to FIG. 3. To do this SPDT switches 33, 34 are operated in synchronism with the time slots 25 so that during certain slots, e.g. slots 6 and 7 of each frame which may be called the monitoring slots, there is no transmission from the LPBTS 2 on the beacon frequency. Instead LPBTS 2 is in the monitoring mode with all received signals passed to the synthesizer 37. During the monitoring mode, the microzone system 10 is quiet and the slots are available for monitoring. Within the microzone 10, transmissions from the LPBTS 2, 4, 6 are synchronized so that the complete system 10 is quiet during the monitoring slots, e.g. 6 and 7 in each frame. This prevents one of the LPBTS 2, 4, 6 from transmitting while one of the others is monitoring. Based on the monitored signal strengths the decisions about allocation of frequencies within the microzone system 10 can be made for each LPBTS either locally within microzone system 10 if the BCF 51 of each LPBTS has sufficient processing capacity, or remotely in OMC 24.

Figure 7:
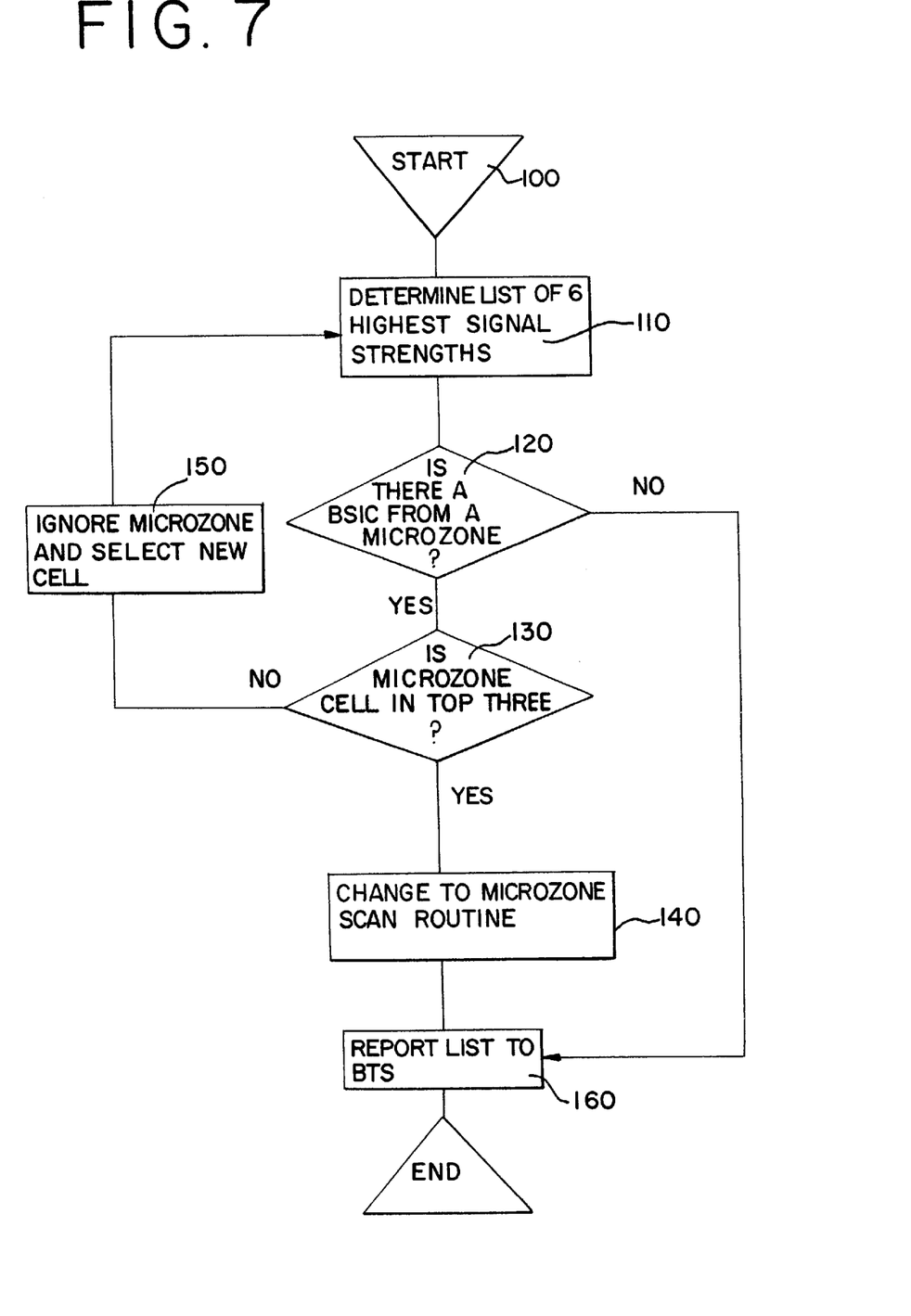
FIG. 7 is a flow diagram of a measurement procedure carried out at a mobile station in accordance with the present invention.

In accordance with a further embodiment of the present invention, the base transceiver stations BTS 16, 18, 22 and the LPBTS 2, 4, 6 are all synchronized so that slot "0" of each frame is always transmitted at the same absolute time from each BTS or LPBTS. In accordance with this embodiment, the mobile stations 12 which can operate equally within both the microzone system 10 and the larger cellular system 15 are specially adapted for use with the discontinuous transmission of the beacon frequency from LPBTS 2, 4, 6 or BTS 16, 22, 24. In accordance with one embodiment the mobile stations 12 only use values of received signals during the part of each frame of the beacon frequency in which there is guaranteed to be a transmission, for example, in the embodiments described above, each mobile station 12 would use the received transmissions in time slots 0–5 for measurement purposes when reporting signal strengths from different cells to the camped-on BTS or LPBTS. Generally, a mobile station 12 will camp on a cell and will take its synchronization from one BTS or LPBTS, 2, 4, 6, 16, 18, 22. The signals from other BTS or LPBTS will arrive at slightly different times due to the different distances between the mobile station 12 and the respective BTS or LPBTS. These differences are likely to be small and may be ignored for signal strength measurements. If necessary, the mobile station 12 can start to take measurements a little after the beginning of slot "0" and stop a little before the end of the final measuring slot, e.g. slot "5". The disadvantage of this embodiment is that there would be no discrimination between the microzone system 10 and the cellular system 15 based on the reduced average energy transmitted by LPBTS in the microzone system 10. In order to maintain this discrimination while allowing the mobile station 12 to adapt to the microzone system 10 when it is within range of such a system the procedure as shown in FIG. 7 may be adopted by mobile stations in accordance with the present invention. In general, a mobile station 12 can only report on the signal strengths of a limited number of neighboring cells, e.g. a maximum of 6 measurements. This is due to the limited time available to the mobile station 12 to send measurements to the BTS 16, 20, 22. The procedure shown in FIG. 7 is based on the use of the Base Station Identity Code (BSIC), which is a code relating to each cell of a cellular network which is transmitted by the BTS of that cell, e.g. as a 8-bit code word broadcast on the synchronization channel using the beacon frequency of every cell. In accordance with the present invention the BSIC 8-bit numbers are allocated so that a mobile station 12 can identify if a cell is part of a microzone system 10 or a cellular system 15. When the mobile station 12 is well within the cellular system 15 the signal power or quality measurements are made on all the slots 25 on the beacon frequency. If any signals are picked up from the microzone system 10, the average energy will be so low that they will not be included in the list of top six signal strength or quality levels reported to the BTS in the cell on which the mobile station 12 is camping. In step 110, the list of BSIC's of the six highest levels is determined in the mobile station 12 and in step 120 the list is examined to see if any carry an identifier indicating the presence of a transmission from a microzone system 10. If not, the list is reported as usual in step 160. If a BSIC from the sub-group of microzone systems is determined, its position within the list is determined in step 130. If the position of the BSIC from a microzone system 10 in the list of highest signal qualities or signal strengths is within a certain distance from the top, e.g. within the top three, the mobile station 12 changes its measurement method in step 140 to that required for microzone systems, i.e. it selects only the signals for measurement from the time slots in which a signal is guaranteed, e.g. slots 0–5 of each frame. The mobile station 12 remains in this mode of measurement until there is no longer a neighboring microzone cell broadcasting a signal on a beacon frequency whose quality or signal strength lies within the top three in the list. If the measurement from the microzone cell lies in the bottom portion of the list, e.g. in positions 4 to 6, the mobile station 12 ignores this measurement in step 150 and the mobile station selects another cell to report on which is not a microzone cell.

In accordance with yet a further embodiment of the present invention the allocation of frequencies for use by the LPBTS 2, 4, 6 is made locally within microzone circuit 10. For instance, the adjacent frequencies to the beacon frequencies are usually not used either in the cell where the beacon frequency is transmitted nor in adjacent cells. These adjacent frequencies may be selected by the monitoring means in accordance with the present invention once the beacon frequencies from adjacent cells have been identified. Preferably, independent frequencies are allotted to each of the LPBTS 2, 4, 6.

While the invention has been shown and described with reference to preferred embodiments, it will be understood by those skilled in the art that various changes or modifications in form and detail may be made without departing from the scope and spirit of this invention.

What we claim is:

1. A cellular mobile radio communications system comprising:
    a first cellular mobile radio communications network comprising:
        at least one cell; and
        a base transceiver station within said cell having means for continuous operation of the base transceiver station in an interrupted transmission mode, the means for continuous operation of the base transceiver station in an interrupted transmission mode comprising means for transmitting traffic signals to at least one active mobile station during a certain time period while maintaining the interrupted mode during the same time period operation, means for receiving traffic signals from the at least one active mobile station while maintaining the interrupted mode during the same time period operation and means for interrupting intermittently all the transmission signals from the base transceiver station during interrupted transmission mode operation.

2. The system according to claim 1, wherein the signals transmitted from said base transceiver station to the at least one active mobile station are in a first frequency band and the signals received at said base transceiver station from the at least one active mobile station are in a second frequency band.

3. The system according to claim 1, further comprising a second cellular mobile radio communication network wherein:
    the second cellular mobile radio communication network comprises a plurality of cells, a beacon signal being transmitted continuously in each cell; and
    the second cellular mobile radio communication network reuses frequencies used in the first cellular mobile radio communication system.

4. The system according to claim 1, wherein the base transceiver station sends messages at more than one frequency.

5. The system according to claim 4, wherein base transceiver station performs slow frequency hopping.

6. The system according to claim 2, wherein the base transceiver station, further comprises means for monitoring signals received by the base transceiver station in the first frequency band while all the transmission signals are interrupted.

7. The system according to claim 2, further comprising means for monitoring signals in the first frequency band while all the transmission signals are interrupted.

8. The system according to claim 7, wherein the monitoring means are within the base transceiver station.

9. A method of operating a cellular mobile radio communication system comprising a first cellular mobile radio communications network having at least one cell and base transceiver station and at least an active mobile station within said cell, the method comprising the step of:
    continuously operating the base transceiver station in an interrupted transmission mode, the continuous interrupted transmission mode operation comprising:

intermittently interrupting all transmission signals from the base station transceiver, allowing transmission of traffic signals from the base transceiver station to the at least one active mobile station during a certain time period while maintaining the continuous interrupted transmission during the same time period mode, and allowing receipt of traffic signals from the at least one active mobile station while maintaining the continuous interrupted transmission during the same time period mode.

10. The method according to claim 9, wherein the base transceiver station transmits signals to the at least one active mobile station in a first frequency band and the base transceiver station receives signals from the at least one mobile station in a second frequency band.

11. The method according to claim 9, wherein the system also comprises a second cellular mobile radio communication network close to the first cellular mobile radio communication network, the second cellular mobile radio communication network comprising a plurality of cells, the method further comprising the steps of:

transmitting continuously a beacon signal in each cell of the second cellular mobile radio communication network, and reusing frequencies in the first cellular mobile radio communication network which are used in the second cellular mobile radio communication network.

12. The method according to claim 9, further comprising the step of:

monitoring signals received in the at least one cell of the first cellular mobile radio communication network while all the transmission signals are interrupted.

13. The system according to claim 2 wherein the means for intermittently interrupting all the transmission of signals includes a switch for coupling a transmission path of the means for transmitting to a receiver path of the means for receiving.

14. The system according to claim 13, wherein the switch includes a single pole double throw switch.

15. The system according to claim 7, further comprising means for a determining at least one characteristic of the monitored signals.

16. The system according to claim 15, wherein the signal characteristic is at least one of signal strength and signal quality.

17. A mobile radio telecommunication system base transceiver station, comprising:

means for continuous operation of the base transceiver station in an interrupted transmission mode, the means for continuous operation of the base transceiver station in an interrupted transmission mode including:

means for intermittently interrupting all the transmission signals from the base transceiver station during interrupted transmission mode operation, means for transmitting traffic signals to at least one active mobile station during a certain time period while maintaining interrupted transmission mode during the same time period operation, and means for receiving traffic signals from the at least one mobile station while maintaining the interrupted transmission during the same time period mode.

18. The station according to claim 17 further comprising means for monitoring signals received by the base transceiver station while the all the transmission signals are interrupted.

19. The station according to claim 17, wherein the means for intermittently interrupting all the transmission signals includes a switch for coupling a transmission path of the means for transmitting to a receiver path of the means for receiving.

20. The station according to claim 19, wherein the switch includes a single pole double throw switch.

21. The station according to claim 18, further comprising means for a determining at least one characteristic of the monitored signals.

22. The station according to claim 21, wherein the signal characteristic is at least one of signal strength and signal quality.

23. The method according to claim 9, wherein the step of at least intermittently interrupting all the transmission signals includes coupling a transmission path of the base transceiver station to the receiver path of the base transceiver station.

24. The method according to claim 12, further comprising the step of determining at least one characteristic of the monitored signals.

25. The method according to claim 24, wherein the signal characteristic is at least one of signal strength and signal quality.

26. A method of operating a mobile radio telecommunication system base transceiver station, comprising the steps of:

continuously operating the base transceiver station in an interrupted transmission mode, the continuous interrupted transmission mode operation comprising:

intermittently interrupting all transmission signals from the base transceiver station, allowing transmission of traffic signals to at least one active mobile during a certain time period while maintaining the continuous interrupted transmission during the same time period mode;

allowing receipt of traffic signals from the at least one active mobile station while maintaining the continuous interrupted transmission during the same time period mode.

27. The method according to claim 26, wherein the base transceiver station transmits signals to the at least one active mobile station in a first frequency band and the base transceiver station receives signals from the at least one mobile station in a second frequency band.

28. The method according to claim 26, further comprising the step of:

monitoring signals received by the base transceiver station while all the transmission signals are interrupted.

29. The method according to claim 26, wherein the step of intermittently interrupting all of the transmission signals includes coupling a transmission path of the base transceiver station to a receiver path of the base transceiver station.

30. A method according to claim 27, further comprising the step of determining at least one characteristic of the monitored signals.

31. The method according to claim 30, wherein the signal characteristic is at least one of signal strength and signal quality.

* * * * *